(12) United States Patent
Wilson

(10) Patent No.: US 8,491,247 B2
(45) Date of Patent: Jul. 23, 2013

(54) FASTENER WITH IMPROVED TORQUE BEARING SURFACE

(75) Inventor: Larry J Wilson, Commerce Township, MI (US)

(73) Assignee: Maclean-Fogg Company, Mundelein, IL (US)

( * ) Notice: Subject to any disclaimer, the term of this patent is extended or adjusted under 35 U.S.C. 154(b) by 386 days.

(21) Appl. No.: 12/949,384

(22) Filed: Nov. 18, 2010

(65) Prior Publication Data

US 2011/0116892 A1    May 19, 2011

Related U.S. Application Data

(60) Provisional application No. 61/262,762, filed on Nov. 19, 2009.

(51) Int. Cl.
*F16B 35/06*   (2006.01)
(52) U.S. Cl.
USPC .............................. 411/402; 411/337; 411/430
(58) Field of Classification Search
USPC .............. 411/337, 372.5, 375, 377, 402, 429, 411/430, 435
See application file for complete search history.

(56) References Cited

U.S. PATENT DOCUMENTS

| | | | |
|---|---|---|---|
| 4,015,503 A * | 4/1977 | Romano | 411/429 |
| 4,143,578 A * | 3/1979 | Becker | 411/430 |
| 4,208,942 A * | 6/1980 | Henrit | 84/421 |
| 4,669,937 A * | 6/1987 | Feldman | 411/429 |
| 4,764,070 A * | 8/1988 | Baltzell et al. | 411/430 |
| 4,775,272 A | 10/1988 | Toth | |
| 4,955,773 A * | 9/1990 | Toth | 411/429 |
| 5,174,704 A | 12/1992 | Kazino et al. | |
| 5,302,069 A * | 4/1994 | Toth et al. | 411/429 |
| 5,380,070 A * | 1/1995 | FitzGerald | 301/37.374 |
| 5,772,377 A | 6/1998 | Bydalek | |
| 6,074,148 A * | 6/2000 | Wilson | 411/430 |
| 6,102,488 A * | 8/2000 | Wilson | 301/35.623 |
| 2003/0068212 A1* | 4/2003 | Wilson | 411/429 |
| 2004/0126202 A1* | 7/2004 | Somers et al. | 411/429 |

FOREIGN PATENT DOCUMENTS

| | | |
|---|---|---|
| DE | 20 2006 004 734 | 7/2006 |
| FR | 2 219 327 | 9/1974 |
| GB | 2113337 A | 8/1983 |

OTHER PUBLICATIONS

The International Search Report and the Written Opinion of the International Searching Authority issued Mar. 9, 2011 in corresponding Appln. No. PCT/US2010/057196.

* cited by examiner

*Primary Examiner* — Roberta Delisle
(74) *Attorney, Agent, or Firm* — Brinks Hofer Gilson & Lione

(57) ABSTRACT

Improved fasteners are provided for minimizing deformation in the corner region of the bearing surfaces. The bearing surfaces have a primary bearing surface and a recessed bearing surface. The primary bearing surfaces may be oriented in a hexagonal shape with opposing surfaces parallel to each other. The recessed bearing surface is disposed inwardly from the primary bearing surface and extends from the primary bearing surface to the end of the bearing surface.

21 Claims, 4 Drawing Sheets

FASTENER WITH IMPROVED TORQUE BEARING SURFACE

This application claims priority to U.S. Provisional Application No. 61/262,762, filed Nov. 19, 2009, which is hereby incorporated by reference herein.

BACKGROUND

The present invention relates generally to fasteners and more particularly to an improved bearing surface for transmitting torque from a tool to the fastener.

Fasteners are used in numerous applications to attach various components together. Typically, a fastener has at least a threaded portion and one or more bearing surfaces attached thereto. The bearing surfaces are designed to receive torque from a tool, such as a socket or wrench, which is used to tighten or loosen the fastener. In a conventional fastener, such as a nut, the fastener may have internal threads and six bearing surfaces oriented in a hexagon shape around the internal threads. However, other fasteners may have external threads, such as bolts and screws. Fasteners may also have a different number of bearing surfaces as desired.

A common problem that conventional fasteners suffer from is undesirable wear on the corners between adjacent bearing surfaces. This typically occurs because the torque forces applied by the tool become concentrated on the corners of the bearing surfaces. As a result, the corners of the bearing surfaces can become severely deformed by the tool. Deformation of the corners of the bearing surfaces can cause numerous problems. For example, one problem that can occur due to deformation of the corners is premature corrosion of the fastener. This is a common problem because many fasteners are treated with a protective coating to prevent corrosion. However, when the corners become deformed, the protective coating can crack and expose untreated portions of the fastener to exterior moisture. Because many fasteners are visible to individuals, corrosion is especially undesirable because it lowers the aesthetic appeal of the fastener and the equipment the fastener is attached to. In addition, a large buildup of corrosion can make it difficult to fit a torque tool onto the fastener. Substantial corrosion over time can also weaken the strength of the fastener.

Severe deformation of the corners can also interfere with the fit between the torque tool and the fastener in several ways. For example, in some cases, the corners of the bearing surfaces can become so severely rounded that the torque tool is no longer able to adequately engage the bearing surfaces of the fastener and may freely rotate around the fastener without transmitting torque to the threaded portion of the fastener. Deformation of the corners of the bearing surfaces can also cause interference between the fastener and the torque tool. In severe cases, the torque tool may become locked to the fastener and become difficult to remove from the fastener. Similarly, it may be difficult or impossible to fit the torque tool onto the fastener due to severe deformation of the corners of the bearing surfaces. This can be a particular problem for fasteners that utilize a cap. Capped fasteners are typically provided with a decorative metal cap made from stainless steel or other corrosion resistant materials. However, one problem with capped fasteners is that the material of the cap is squeezed between the torque tool and the bearing surfaces of the fastener. As a result, the cap material can swell in size relative to the fastener body and cause interference with the torque tool. In severe cases, the cap material may also fracture.

Accordingly, the inventor believes it would be desirable to provide an improved fastener.

SUMMARY

Improved fasteners are described which may reduce deformation of the bearing surfaces compared to conventional fasteners that have flat bearing surfaces across the entire length of the bearing surface. The improved fasteners have bearing surfaces with a primary bearing surface and a recessed bearing surface. The primary bearing surface is centrally located along the bearing surface and may be defined by an industry standard. The recessed bearing surface extends from the end of the primary bearing surface to the end of the bearing surface. The recessed bearing surface is disposed inwardly from an imaginary plane defined by the primary bearing surface. Additional details and advantages are described below in the detailed description.

The invention may include any of the following aspects in various combinations and may also include any other aspect described below in the written description or in the attached drawings.

A fastener manufactured to comprise a threaded portion and a bearing surface, the bearing surface being designed to receive torque from a tool and transmit the torque to the threaded portion, the bearing surface comprising: a primary bearing surface and a recessed bearing surface, the primary bearing surface extending across a center of the bearing surface and the recessed bearing surface extending from the primary bearing surface to an end of the bearing surface, wherein the recessed bearing surface is disposed inward from an imaginary plane defined by said primary bearing surface.

The fastener wherein the recessed bearing surface is smoothly contoured away from the primary bearing surface.

The fastener wherein the recessed bearing surface is flat and extends along an angle from the imaginary plane.

The fastener wherein said angle is between about 3° and 5°.

The fastener further comprising a corresponding recessed bearing surface extending from an opposite side of the primary bearing surface, the recessed bearing surface and the corresponding recessed bearing surface being mirror images of each other and symmetrically disposed about the primary bearing surface.

The fastener wherein said recessed bearing surface extends between about 20% and 25% of the bearing surface.

The fastener wherein the fastener consists of six of the bearing surfaces, the bearing surfaces being oriented in a hexagonal shape with opposing primary bearing surfaces being parallel to each other.

The fastener wherein a distance between the opposing primary bearing surfaces is defined by a dimension determined by an industry standard.

The fastener wherein the distance between opposing primary bearing surfaces is defined by an industry standard upper limit and an increased lower limit from said industry standard such that a tolerance range is about 40% less than a standard tolerance range determined by the industry standard.

The fastener wherein the threaded portion comprises internal threads.

The fastener wherein the threaded portion comprises external threads.

The fastener wherein the fastener further comprises a cap disposed about the bearing surface.

The fastener wherein the fastener consists of six of the bearing surfaces, the bearing surfaces being oriented in a hexagonal shape with opposing primary bearing surfaces being parallel to each other, the cap consisting of six corresponding bearing surfaces, the cap bearing surfaces being oriented in a hexagonal shape with opposing cap bearing surfaces being parallel to each other, wherein each of the cap bearing surfaces overlies one of the bearing surfaces, wherein a distance between opposing cap bearing surfaces is defined by a dimension determined by an industry standard.

The fastener wherein the cap bearing surfaces are flat across the entire bearing surfaces.

The fastener wherein the cap bearing surfaces comprise recessed cap bearing surfaces that correspond to the recessed bearing surfaces.

The fastener wherein the threaded portion comprises internal threads.

The fastener wherein the fastener comprises a flange portion, the cap being pressed around the flange to retain the cap onto the bearing surfaces without welding the cap.

A fastener manufactured to comprise a threaded portion and a bearing surface, the bearing surface being designed to receive torque from a tool and transmit the torque to the threaded portion, the bearing surface comprising: a primary bearing surface and a recessed bearing surface, said primary bearing surface extending across a center of said bearing surface and said recessed bearing surface extending from said primary bearing surface to an end of said bearing surface, wherein said recessed bearing surface is disposed inward from an imaginary plane defined by said primary bearing surface, said recessed bearing surface being smoothly contoured away from said primary bearing surface and being flat and extending along an angle from said imaginary plane, wherein said angle is between about 3° and 5°, further comprising a corresponding recessed bearing surface extending from an opposite side of said primary bearing surface, said recessed bearing surface and said corresponding recessed bearing surface being mirror images of each other and symmetrically disposed about said primary bearing surface, wherein each of said recessed bearing surfaces and corresponding recessed bearing surfaces extend between about 20% and 25% of the bearing surface, said fastener consisting of six of said bearing surfaces, said bearing surfaces being oriented in a hexagonal shape with opposing primary bearing surfaces being parallel to each other, wherein a distance between said opposing primary bearing surfaces is defined by a dimension determined by an industry standard.

A fastener manufactured to comprise a threaded portion, a bearing surface, and a cap, the bearing surface being designed to receive torque from a tool and transmit the torque to the threaded portion, the bearing surface comprising:

a primary bearing surface and a recessed bearing surface, the primary bearing surface extending across a center of the bearing surface and the recessed bearing surface extending from the primary bearing surface to an end of the bearing surface, wherein the recessed bearing surface is disposed inward from an imaginary plane defined by the primary bearing surface, wherein the fastener consists of six of the bearing surfaces, the bearing surfaces being oriented in a hexagonal shape with opposing primary bearing surfaces being parallel to each other, the fastener further comprising a cap disposed about the bearing surface, the cap consisting of six corresponding bearing surfaces, the cap bearing surfaces being oriented in a hexagonal shape with opposing cap bearing surfaces being parallel to each other, wherein each of the cap bearing surfaces overlies one of the bearing surfaces, wherein a distance between opposing cap bearing surfaces is defined by a dimension determined by an industry standard, the fastener further comprising a flange portion, the cap being pressed around the flange to retain the cap onto the bearing surfaces without welding the cap.

The fastener wherein the cap bearing surfaces are flat across the entire bearing surfaces.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
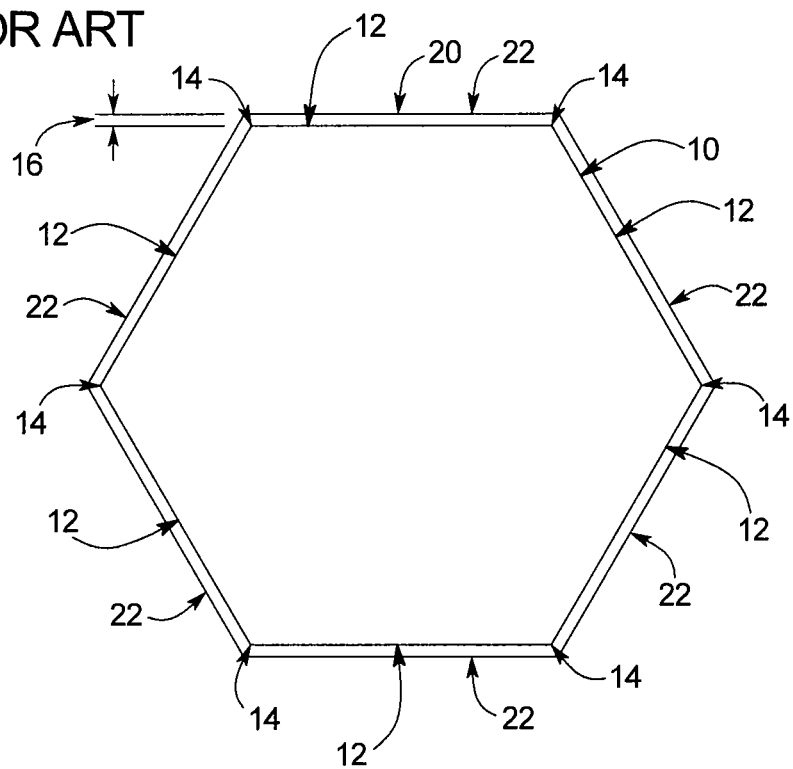
FIG. 1 is a top cross-sectional schematic view of a torque tool and a prior art fastener before torque is applied to the fastener.
Figure 2:
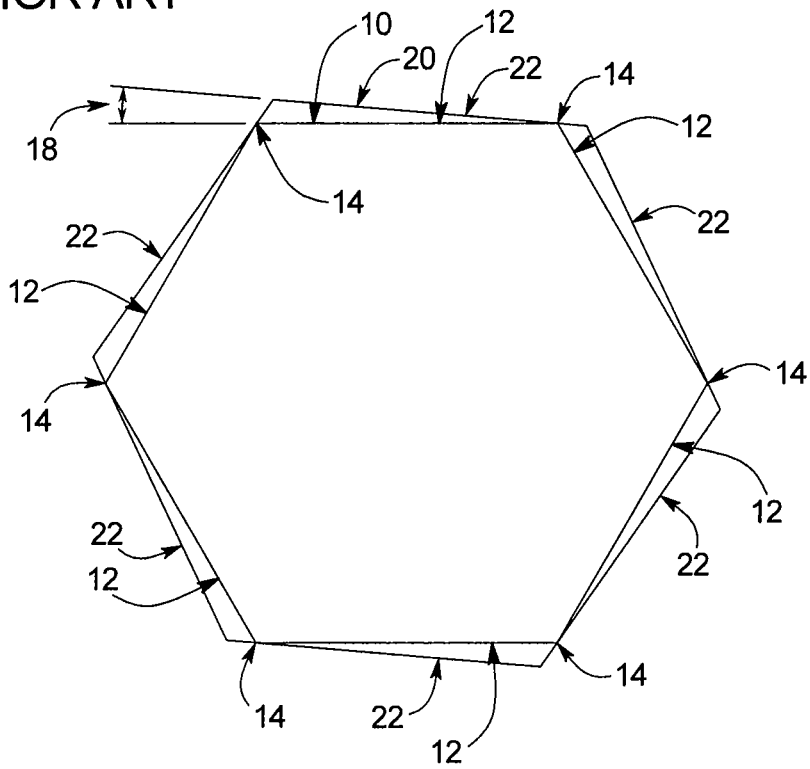
FIG. 2 is a top cross-sectional schematic view of the torque tool and prior art fastener shown in FIG. 1 after torque is applied to the fastener.

Referring now to the figures, and particularly to FIGS. 1 and 2, a prior art fastener 10 and a torque tool 20 are shown. Preferably, the fastener 10 is an industry standard fastener 10 with hexagon-shaped bearing surfaces 12. Although the preferred embodiment of the fastener 10 described herein is hexagonal in shape, the principles taught by this disclosure may apply to other shapes of fasteners as well, such as square fasteners. Moreover, the preferred embodiments relate to industry standard fasteners as defined, for example by ANSI, DIN, and ISO, such as ANSI B18.2.4.2M, Metric Hex Nuts, Style 2. Typically, the fastener also has a threaded portion (not shown), which may be either external threads in the case of a bolt or screw or may be internal threads in the case of a nut.

As shown, the fastener 10 is manufactured to have six bearing surfaces 12 with oppositely positioned bearing surfaces 12 parallel to each other. The fastener 10 may be manufactured by many conventional manufacturing processes, such as cold forming, hot forging, machining and casting. Conventional industry fasteners are typically designed with bearing surfaces 12 that are flat across the entire length of each bearing surface 12. Thus, the fastener 10 forms a generally true hexagonal shape. The bearing surfaces 12 are joined at each end by adjacent bearing surfaces 12, thereby forming corners 14 between each bearing surface 12. The torque tool 20 may be an industry standard 6-point socket, meaning that the socket matches the shape of the hexagon-shaped fastener and has six corners and six sides 22. However, 12-point sockets, open ended wrenches and other shaped torque tools may also be used. In order for the torque tool 20 to easily engage and disengage from the fastener 10, a clearance 16 is designed into the system between the torque tool 20 and the bearing surfaces 12 of the fastener 10. Typically, the clearance 16 is defined by industry standards for the torque tool 20 and the fastener 10. In particular, industry standards define nominal dimensions and tolerance ranges for the sizes of the torque tool 20 and the fastener 10. In order to ensure that the torque tool 20 will be able to fit onto the fastener 10 without interference, the nominal dimension and tolerance range for the torque tool 20 is designed to be larger and not overlap with the nominal dimension and tolerance range of the fastener 10. As a result of the tolerance ranges, the amount of clearance between the fastener 10 and the torque tool 20 varies depending on the actual sizes that the fastener 10 and the torque tool 20 are manufactured to. For example, the largest clearance 16 occurs when the torque tool 20 is manufactured to the largest size allowed by the nominal dimension and tolerance range while the fastener 10 is manufactured to the smallest size allowed by the nominal dimension and tolerance range. Similarly, the smallest clearance 16 occurs when the torque tool 20 is manufactured to the smallest allowed size while the fastener 10 is manufactured to the largest allowed size. The clearance 16 that is shown in FIG. 1 is representative of the initial clearance 16 before any torque is applied to the tool 20 and the fastener 10.

Turning to FIG. 2, the same fastener 10 and torque tool 20 shown in FIG. 1 are shown with torque applied in a typical tightening situation. That is, the torque tool 20 has been rotated clockwise while the fastener 10 remains fixed in place. As shown, the torque tool rotates until the sides 22 of the torque tool 20 contact the corners 14 of the fastener 10. At this point, the torque tool 20 starts to transmit torque to the bearing surfaces 12 of the fastener 10, thereby transmitting torque through the fastener 10 to the threads of the fastener 10. However, because the sides 22 of the torque tool 20 primarily contact the corners 14 of the fastener 10, the forces from the torque tool 20 are concentrated on the region of the bearing surfaces 12 closest to the corners 14. As a result, the regions near the corners 14 deform until the contact area between the fastener 10 and the torque tool 20 has increased enough to reduce the pressure generated by the applied torque to a level that is below the elastic limit of the fastener 10 material. The worst condition for causing deformation typically occurs when the torque tool 20 is larger than the nominal dimension and the fastener 10 is smaller than the nominal dimension. For example, in the case of an industry standard 19 mm hexagon arrangement when the torque tool 20 is manufactured to the largest allowed size and the fastener 10 is manufactured to the smallest allowed size, the initial angle 18 formed between the sides 22 of the torque tool 20 and the sides 12 of the fastener 10 at initial contact between the sides 22 of the torque tool 20 and the corners 14 of the fastener 10 can be 3.72°. When the angle 18 is large, as in this example, the corners 14 of the fastener 10 must deform more before the pressure reduces enough to avoid further plastic deformation.

Plastic deformation of the corners 14 of the fastener 10 is undesirable for a number of reasons as explained above. One attempt that has been made to reduce this problem is described in U.S. Pat. No. 5,174,704 to Kazino et al. In this disclosure, the bearing surfaces are inclined from the center of the bearing surfaces to the ends of the bearing surfaces. However, upon further investigation, the solution proposed by this disclosure can actually worsen the deformation problem by increasing the initial contact angle between the bearing surfaces of the fastener and the sides of the torque tool. Thus, this solution is undesirable.

Figure 3:
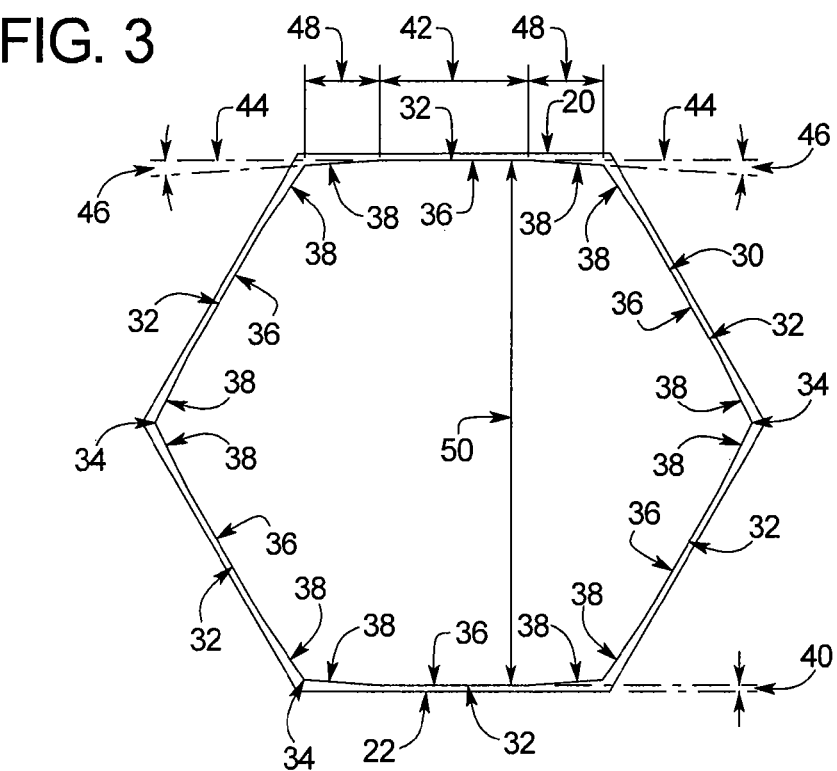
FIG. 3 is a top cross-sectional schematic view of a torque tool and an improved fastener before torque is applied to the fastener.
Figure 4:
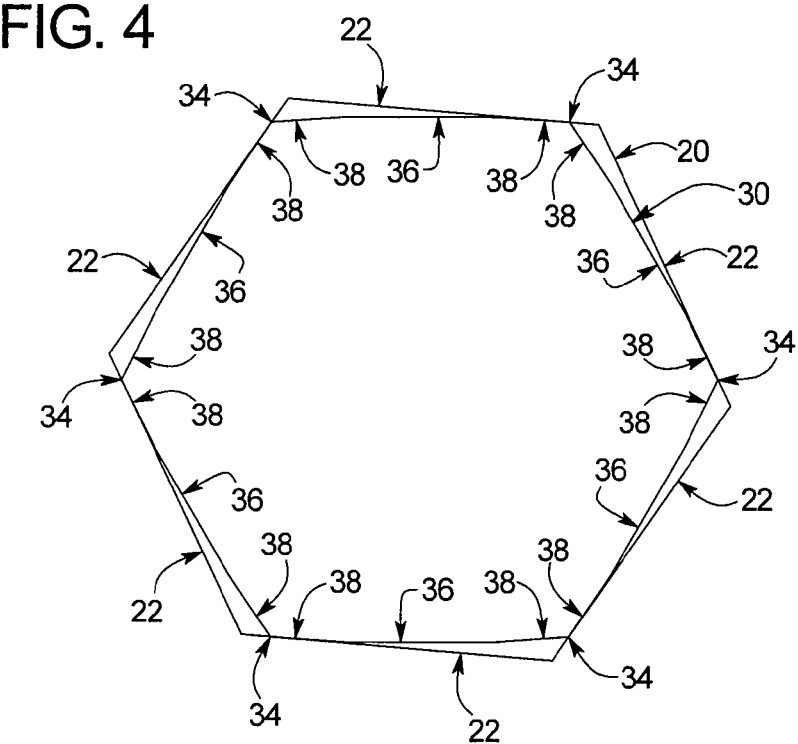
FIG. 4 is a top cross-sectional schematic view of the torque tool and the improved fastener in FIG. 3 after torque is applied to the fastener.

Turning to FIGS. 3 and 4, an improved fastener 30 is provided to minimize deformation of the fastener 30 when an industry standard torque tool 20 is used to tighten or loosen the fastener 30. The fastener 30 is manufactured with bearing surfaces 32 that each include a primary bearing surface 36 and a recessed bearing surface 38. Although the fastener 30 is shown with six bearing surfaces 32, more or less bearing surfaces may be possible. Preferably, each bearing surface 32 has two recessed bearing surfaces 38 symmetrically disposed about the primary bearing surface 36. Thus, the recessed bearing surfaces 38 on each bearing surface 32 may be mirror images of each other. Preferably, the primary bearing surfaces 36 extend across the center of the bearing surfaces 32 and are symmetrically disposed thereabout. The recessed bearing surfaces 38 are preferably smoothly contoured away from the primary bearing surfaces 36 and form a flat surface angled inwardly from the primary bearing surfaces 36. The end of the recessed bearing surface may be joined to a recessed bearing surface 38 of the adjacent bearing surface 32 to form a corner 34 therebetween. An angle 46 formed between an imaginary plane 44 extending from the primary bearing surface 36 and the recessed bearing surface 38 may be between 3° and 5° and is preferably about 4°. The length 42 of the primary bearing surface 36 may be between 50% and 60% of the overall length of the bearing surface 32 and is preferably about 55% of the overall length. The length 48 of the recessed bearing surfaces 38 may be between 20% and 25% of the overall length of the bearing surface 32 and are preferably about 22.5% of the overall length. The distance 50 and the tolerance thereof between opposing primary bearing surfaces 36 is preferably the same as the distance defined by the applicable industry standard. Thus, the clearance 40 between the primary bearing surfaces 32 and the sides 22 of the torque tool 20 may be the same as the clearance 16 for a conventional fastener 10. However, if desired, the distance 50 and the tolerance thereof may be changed from the industry standard to reduce or increase the clearance 40. For example, the distance 50 between opposing primary bearing surfaces may be changed from the industry standard tolerance range so that upper tolerance limit remains the same as the industry standard while the lower tolerance limit is increased from the industry standard so that the tolerance range is 40% less than the industry standard tolerance range.

Turning to FIG. 4, the improved fastener 30 reduces the deformation that occurs at the corners 34 by increasing the contact area between the bearing surfaces 32 of the fastener 30 and the sides 20 of the torque tool 20. As shown, the torque tool 20 rotates until the sides of the torque tool 20 contact the recessed bearing surfaces 38 of the fastener 30. At this point, the torque tool 20 starts to transmit torque through the recessed bearing surfaces 38, thereby transmitting torque through the fastener 30 to the threads of the fastener 30. Because the initial contact between the side surfaces 22 of the torque tool 20 and the recessed bearing surfaces 38 occurs along a generally parallel plane the initial contact area is significantly larger than with a conventional fastener 10. As a result, the initial pressure generated by the applied torque is less and will likely cause less deformation of the fastener 30.

The advantages of the improved fastener 30 are now more apparent. The improved fastener 30 is likely to improve corrosion resistance for fasteners that have been treated by a protective coating, since it is possible that the lower stress experienced by the bearing surfaces 32 will avoid cracking the protective coating. For example, coatings that adhere well to the fastener 30 but are brittle, like chrome plating, may be particularly useful with the improved fastener 30. Chrome plating is particularly susceptible to cracking on conventional fasteners because chrome plating is brittle and when the underlying substrate, i.e., the fastener, deforms the chrome plating cannot reform with the fastener without cracking. By contrast, the improved fastener 30 will experience less deformation, and thus, may be more useful with coatings like chrome plating. In addition, it is also possible that the fastener 30 will be able to withstand a higher number of tightening and loosening cycles without rounding off the corners 34 of the fastener 30. Alternatively, the fastener 30 may be able to withstand higher tightening and loosening torques than conventional fasteners can typically withstand.

Figure 5:
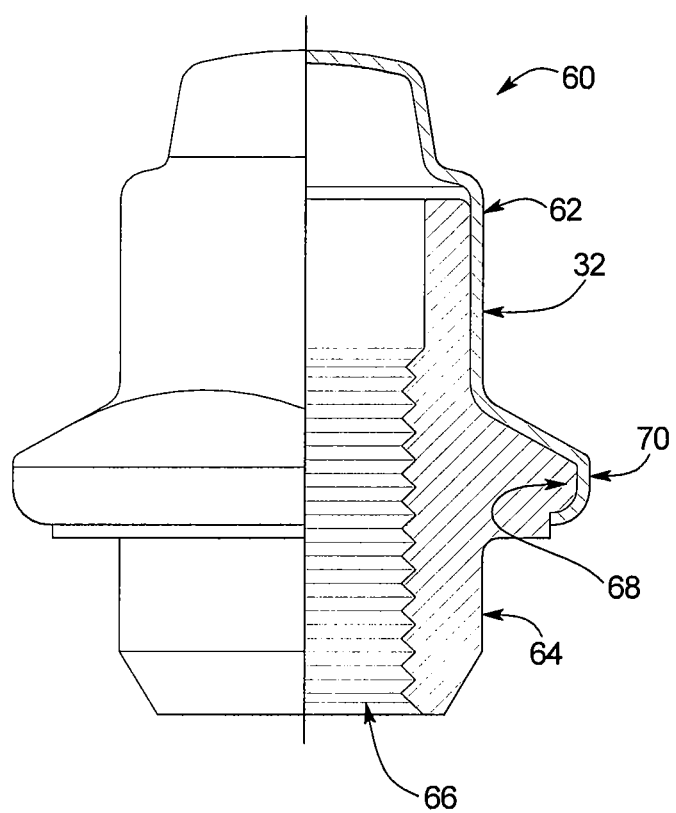
FIG. 5 is a side cross-sectional schematic view of an improved fastener with a cap.
Figure 6:
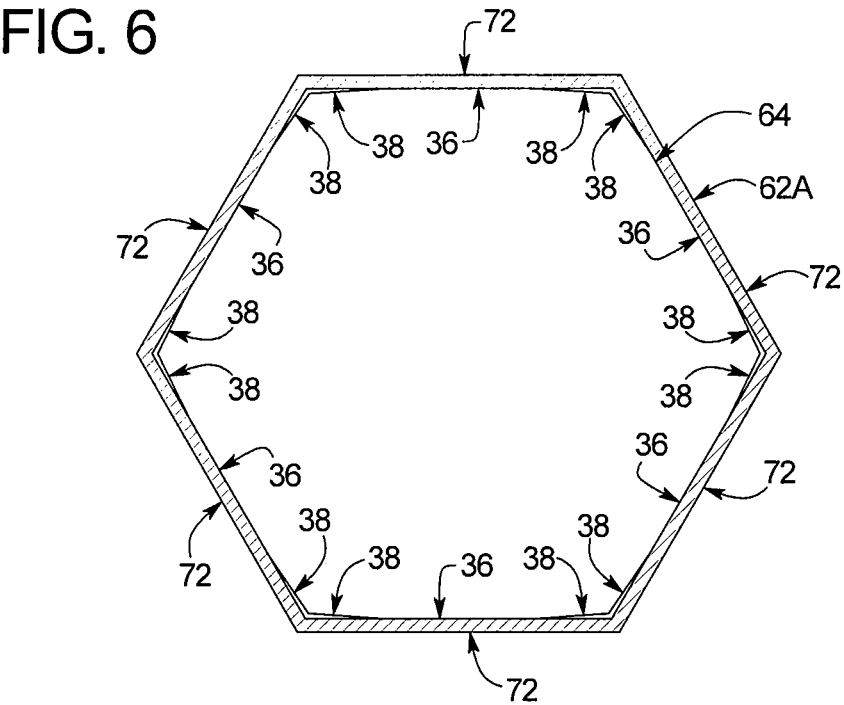
FIG. 6 is a top cross-sectional schematic view of an improved fastener with a cap.
Figure 7:
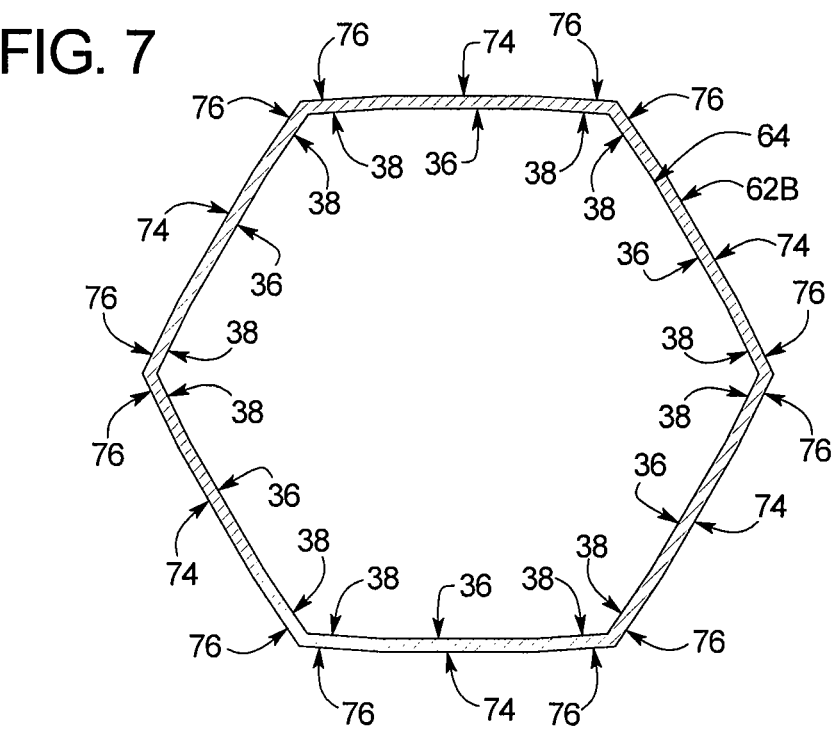
FIG. 7 is a top cross-sectional schematic view of another improved fastener with a cap.

Another application in which the improved fastener may be useful is capped fasteners. Turning to FIGS. 5-7, a capped fastener 60 is provided with the improved bearing surfaces 32. As shown in the figures, the capped fastener 60 has a cap 62 that overlies the bearing surfaces 32. The cap 62 material may be made from a variety of materials, such as stainless steel, and may be manufactured by stamping or other processes. The cap 62 is primarily provided as a cost-effective aesthetic feature to cover the fastener body 64. The fastener body 64 that is shown includes internal threads 66 but may also be provided with external threads if desired. Preferably, the fastener body 64 has a flange 68 extending outward around the fastener body 64. The cap 62 may be welded to the fastener body 64, or more preferably, may be pressed around the flange 68 to retain the cap 62 to the fastener body 64 without welding. As shown in FIG. 6, the bearing surfaces 72 of the cap 62A may be flat across the entire length of the bearing surfaces 72. The advantage of this design is that it may be easier to manufacture the caps 62A with a conventional hexagonal or other simple-sided shape. If the thickness of the cap 62A is uniform, a small gap will exist between the cap 62A and the recessed bearing surfaces 38 of the fastener body 64. However, this may be acceptable because a small amount of deformation of the cap 62A may take place during the initial uses of the fastener 60. As a result, the cap 62A may slightly reform around the recessed bearing surfaces 38. Thereafter, the reduced stress experienced by the fastener 60 due to the improved bearing surfaces 32 may minimize further deformation of the cap 62A. Alternatively, as shown in FIG. 7, the cap 62B may be manufactured to have recessed bearing surfaces 76 that correspond to the recessed bearing surfaces 38 of the fastener body 64. While this design may make the cap 62B more expensive to manufacture, the cap 62B may experience less deformation, which may be desirable for certain applications.

The improved capped fastener 60 may be especially useful when the cap 62 is not welded to the fastener body 64. Non-welded capped fasteners 60 are particularly desirable because the lack of a weld between the cap 62 and the fastener body 64 simplifies manufacturing and reduces the cost of the capped fastener 60. However, one disadvantage of non-welded capped fasteners is that there is less rotational support of the cap 62 relative to the fastener body 64. In other words, when tightening or loosening torque is applied to the capped fastener 60, the cap 62 may rotate a small amount relative to the fastener body 64. As a result, successive cycles of tightening and loosening can cause the cap to be rotated back and forth and experience a high frequency of stress reversals which repeatedly deforms the cap and can lead to the cap becoming stuck in the torque tool and/or cracking along the corners of the cap. The improved capped fastener 62 with the improved bearing surfaces 32 may overcome this problem by minimizing the stress that is applied to the cap 62 when a torque tool 20 is used to tighten and loosen the capped fastener 62. Thus, the capped fastener 62 may last longer with less cracking and deformation of the cap 62.

For example, in tests of the improved fastener, a conventional M12 non-welded capped nut was compared with an improved M12 non-welded nut with the recessed bearing surfaces 38. In the test, an impact tool was used to tighten the nuts to 170 Nm and then loosen the nuts. This cycle was repeated on each nut until each nut stuck in the impact tool socket so that the nut could not be easily removed with the operator's fingers. On average, the conventional nut failed after 35 cycles, whereas the improved nut failed after 54 cycles. In another test, a conventional M14 non-welded nut was compared with an improved M14 non-welded nut with the recessed bearing surfaces 38. In the test, the distance across the bearing surfaces of each cap were initially measured before applying any torque to the nuts. Then, an impact tool was used to tighten the nuts to 170 Nm and then loosen the nuts. This cycle was repeated on each nut for 100 cycles, and then the distance across the bearing surfaces of each cap was measured again to determine the amount of deformation in the cap that had occurred. On average, the initial distance across the bearing surfaces and the final distance across the bearing surfaces for the conventional M14 nut were 0.8657" and 0.8727", respectively. Thus, the distance across the bearing surfaces for the conventional M14 nut increased by 0.007". By contrast, on average, the initial distance across the bearing surfaces and the final distance across the bearing surfaces for the improved M14 nut were 0.8657" and 0.8687", respectively. Thus, the distance across the bearing surfaces for the improved M14 nut increased by 0.003".

In addition to the fasteners described herein, the improved bearing surfaces 32 may also be used to provide an improved torque tool for use with conventional fasteners. For example, the bearing surfaces 32 may be reversed in shape and used in a torque tool that has a primary bearing surface and recessed bearing surfaces that are disposed outward from the primary bearing surfaces.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

I claim:

1. A fastener manufactured to comprise a threaded portion and a bearing surface, said bearing surface being designed to receive torque from a tool and transmit said torque to said threaded portion, said bearing surface comprising:
a primary bearing surface and a recessed bearing surface, said primary bearing surface extending across a center of said bearing surface and said recessed bearing surface extending from said primary bearing surface to an end of said bearing surface, wherein said recessed bearing surface is disposed inward from an imaginary plane defined by said primary bearing surface toward the center axis of the fastener.

2. The fastener according to claim 1, wherein said recessed bearing surface is smoothly contoured away from said primary bearing surface.

3. The fastener according to claim 2, wherein said recessed bearing surface is flat and extends along an angle from said imaginary plane.

4. The fastener according to claim 3, wherein said angle is between about 3° and 5°.

5. The fastener according to claim 3, further comprising a corresponding recessed bearing surface extending from an opposite side of said primary bearing surface, said recessed bearing surface and said corresponding recessed bearing surface being mirror images of each other and symmetrically disposed about said primary bearing surface.

6. The fastener according to claim 1, wherein said recessed bearing surface extends between about 20% and 25% of the bearing surface.

7. The fastener according to claim 1, wherein said fastener consists of six of said bearing surfaces, said bearing surfaces being oriented in a hexagonal shape with opposing primary bearing surfaces being parallel to each other.

8. The fastener according to claim 7, wherein a distance between said opposing primary bearing surfaces is defined by a dimension determined by an industry standard.

9. The fastener according to claim 7, wherein said distance between opposing primary bearing surfaces is defined by an industry standard upper limit and an increased lower limit from said industry standard such that a tolerance range is about 40% less than a standard tolerance range determined by said industry standard.

10. The fastener according to claim 1, wherein said threaded portion comprises internal threads.

11. The fastener according to claim 1, wherein said threaded portion comprises external threads.

12. The fastener according to claim 1, wherein said fastener further comprises a cap disposed about said bearing surface.

13. The fastener according to claim 12, wherein said fastener consists of six of said bearing surfaces, said bearing surfaces being oriented in a hexagonal shape with opposing primary bearing surfaces being parallel to each other, said cap consisting of six corresponding bearing surfaces, said cap bearing surfaces being oriented in a hexagonal shape with opposing cap bearing surfaces being parallel to each other, wherein each of said cap bearing surfaces overlies one of said bearing surfaces, wherein a distance between opposing cap bearing surfaces is defined by a dimension determined by an industry standard.

14. The fastener according to claim 13, wherein said cap bearing surfaces are flat across the entire bearing surfaces.

15. The fastener according to claim 13, wherein said cap bearing surfaces comprise recessed cap bearing surfaces that correspond to said recessed bearing surfaces.

16. The fastener according to claim 13, wherein said threaded portion comprises internal threads.

17. The fastener according to claim 16, wherein said fastener comprises a flange portion, said cap being pressed around said flange to retain said cap onto said bearing surfaces without welding said cap.

18. A fastener manufactured to comprise a threaded portion and a bearing surface, said bearing surface being designed to receive torque from a tool and transmit said torque to said threaded portion, said bearing surface comprising:
a primary bearing surface and a recessed bearing surface, said primary bearing surface extending across a center of said bearing surface and said recessed bearing surface extending from said primary bearing surface to an end of said bearing surface, wherein said recessed bearing surface is disposed inward from an imaginary plane defined by said primary bearing surface toward the center axis of the fastener, said recessed bearing surface being smoothly contoured away from said primary bearing surface and being flat and extending along an angle from said imaginary plane, wherein said angle is between about 3° and 5°, further comprising a corresponding recessed bearing surface extending from an opposite side of said primary bearing surface, said recessed bearing surface and said corresponding recessed bearing surface being mirror images of each other and symmetrically disposed about said primary bearing surface, wherein each of said recessed bearing surfaces and corresponding recessed bearing surfaces extend between about 20% and 25% of the bearing surface, said fastener consisting of six of said bearing surfaces, said bearing surfaces being oriented in a hexagonal shape with opposing primary bearing surfaces being parallel to each other, wherein a distance between said opposing primary bearing surfaces is defined by a dimension determined by an industry standard.

19. A fastener manufactured to comprise a threaded portion, a bearing surface, and a cap, said bearing surface being designed to receive torque from a tool and transmit said torque to said threaded portion, said bearing surface comprising:
a primary bearing surface and a recessed bearing surface, said primary bearing surface extending across a center of said bearing surface and said recessed bearing surface extending from said primary bearing surface to an end of said bearing surface, wherein said recessed bearing surface is disposed inward from an imaginary plane defined by said primary bearing surface toward the center axis of the fastener, wherein said fastener consists of six of said bearing surfaces, said bearing surfaces being oriented in a hexagonal shape with opposing primary bearing surfaces being parallel to each other,
said fastener further comprising a cap disposed about said bearing surface, said cap consisting of six corresponding bearing surfaces, said cap bearing surfaces being oriented in a hexagonal shape with opposing cap bearing surfaces being parallel to each other, wherein each of said cap bearing surfaces overlies one of said bearing surfaces, wherein a distance between opposing cap bearing surfaces is defined by a dimension determined by an industry standard,
said fastener further comprising a flange portion, said cap being pressed around said flange to retain said cap onto said bearing surfaces without welding said cap.

20. The fastener according to claim 19, wherein said cap bearing surfaces are flat across the entire bearing surfaces.

21. The fastener according to claim 19, wherein said cap bearing surfaces comprise recessed cap bearing surfaces that correspond to said recessed bearing surfaces.

* * * * *